United States Patent [19]

Jain

[11] Patent Number: 5,202,096
[45] Date of Patent: Apr. 13, 1993

[54] APPARATUS FOR LOW TEMPERATURE PURIFICATION OF GASES

[75] Inventor: Ravi Jain, Piscataway, N.J.

[73] Assignee: The BOC Group, Inc., Murray Hill, N.J.

[21] Appl. No.: 724,094

[22] Filed: Aug. 15, 1991

Related U.S. Application Data

[62] Division of Ser. No. 467,673, Jan. 19, 1990, Pat. No. 5,110,569.

[51] Int. Cl.$^5$ .............................................. B01J 8/04
[52] U.S. Cl. ..................................... 422/190; 422/189; 422/191; 55/31; 55/33; 55/68; 55/76; 423/230; 423/247; 423/248; 62/11
[58] Field of Search ............... 423/351, 220, 219, 247, 423/248, 230; 55/31, 33, 75, 74, 68, 76; 422/189, 190, 191; 62/11

[56] References Cited

U.S. PATENT DOCUMENTS

| | | | |
|---|---|---|---|
| 3,672,824 | 6/1972 | Tamura et al. | 622/122 X |
| 4,579,723 | 4/1986 | Weltmer et al. | 423/219 |
| 4,713,226 | 12/1987 | Tamhankar et al. | 423/219 |
| 4,869,883 | 9/1989 | Thorogood et al. | 423/219 |
| 4,933,158 | 6/1990 | Aritsuka et al. | 423/210 |
| 4,983,194 | 1/1991 | Hopkins et al. | 62/22 |

Primary Examiner—James C. Housel
Assistant Examiner—Long V. Le
Attorney, Agent, or Firm—Coleman R. Reap; Larry R. Cassett

[57] ABSTRACT

Apparatus for producing a substantially pure nitrogen product from a gas stream containing as impurities carbon monoxide, carbon dioxide, water vapor and hydrogen, comprising a first adsorption unit which removes water vapor and carbon dioxide from the gas stream, a catalytic reactor which oxidizes carbon monoxide and hydrogen in the gas stream leaving the first adsorption unit to carbon dioxide and water vapor, respectively, a second adsorption unit which removes water vapor and carbon dioxide from the catalytically treated gas stream, a cryogenic distillation unit which separates nitrogen from oxygen in the gas stream leaving the second adsorption unit and a conduit connecting the cryogenic distillation unit with the adsorption units for purging the adsorption units with waste gas from the cryogenic distillation unit.

8 Claims, 3 Drawing Sheets

APPARATUS FOR LOW TEMPERATURE PURIFICATION OF GASES

This is a division of application Ser. No. 07/467,673, filed Jan. 19, 1990, now U.S. Pat. No. 5,110,569.

FIELD OF THE INVENTION

The present invention relates generally to a process for the production of high purity gases at low temperatures and, particularly, to a continuous process of removing carbon dioxide, carbon monoxide, hydrogen and water vapor from a gas mixture, preferably air.

BACKGROUND OF THE INVENTION

High purity gases such as nitrogen in which impurities are present in amounts well below part per million levels are required in the manufacture of integrated circuits to prevent defects in chips of increasing line densities. Cryogenic distillation is typically used for the production of highly purified nitrogen gas.

Removal of impurities from the feed gas for cryogenic distillation is required for the production of high purity nitrogen. When air is used as the feed gas, impurities, such as $H_2O$ and $CO_2$, have to be removed to prevent freeze-up in the low temperature sections of the plant while other impurities, such as $H_2$ and CO, have to be removed to prevent contamination of the nitrogen product.

A two-step procedure has been employed for the removal of these impurities from air in a nitrogen production process. In the first step, a compressed feed gas is heated to temperatures between 150° to 250° C. and then contacted with a catalyst to oxidize CO to $CO_2$ and $H_2$ to $H_2O$. Noble metal catalysts, typically based on platinum, are commonly used for the oxidation step. In the second step, the oxidization products, $CO_2$ and $H_2O$, are removed from the compressed gas stream either by a temperature-swing adsorption process (see K. B. Wilson, A. R. Smith and A. Theobald, *IOMA BROADCASTER*, Jan–Feb 1984, pp 15-20) or by a pressure-swing adsorption process (see M. Tomonura, S. Nogita, *Kagaku Kogaku Ronbunshu*, Vol. 13, No. 5, 1987, pp 548-553).

These processes, although effective, are disadvantageous for the commercial scale production of highly purified gases, particularly nitrogen gas due to their high cost of operation. The cost of operation is high because of the extensive use of expensive noble metal catalysts. In addition, separate vessels must be used for the catalytic treatment step and the adsorption step to remove the impurities. In addition, heat exchangers are required to both heat the gas as it passes into the catalyst vessel and cool the effluent therefrom. This poses additional costs, both in terms of equipment and energy.

Low temperature processes for removing parts per million levels of impurities from inert gas streams are also known in the art. Weltmer et al., U.S. Pat. No. 4,579,723, discloses passing an inert gas stream containing nitrogen or argon through a catalytic bed containing a mixture of chromium and platinum on gamma-alumina and a second bed composed of a mixture of several metals mounted on gamma-alumina. The beds effectively convert carbon monoxide to carbon dioxide and hydrogen to water vapor and adsorb the resulting impurities to produce a product stream containing total impurities of less than 1.0 part per million.

Tamhankar et al., U.S. Pat. No. 4,713.224, discloses a one-step process for purifying gases containing minute quantities of CO, $CO_2$, $O_2$, $H_2$ and $H_2O$ in which the gas stream is passed through a particulate material comprised of nickel having a large surface area.

Processes for the ambient temperature conversion of carbon monoxide to carbon dioxide have also been described as, for example, by Tamura et al., U.S. Pat. No. 3,672,824, and Frevel et al., U.S. Pat. No. 3,758,666.

None of these processes, however, provide an integrated low temperature system in which a feed stream which contains up to significant amounts of impurities can be treated in an efficient and inexpensive manner to obtain highly purified gaseous products which can be subsequently treated to produce high purity gases, such as nitrogen.

It is, therefore, an object of the present invention to provide a process for producing highly purified gaseous products from a feed stream contain- ing up to significant amounts of impurities.

It is another object of the invention to provide a process for purifying oxygen-containing gas streams suitable for the production of highly purified nitrogen by cryogenic distillation.

SUMMARY OF THE INVENTION

The present invention is generally directed to a process for producing a substantially pure gaseous product from a feed stream containing the impurities carbon monoxide, carbon dioxide, hydrogen and water vapor and, particularly, to the treatment of feed streams which contain more than minute amounts of such impurities. The process comprises removing water vapor, if present, from the feed stream, contacting the feed stream with an oxidation catalyst to thereby convert the carbon monoxide present to carbon dioxide and the hydrogen present to water vapor. The water vapor and carbon dioxide obtained from the oxidation step and any other carbon dioxide and water vapor present are thereafter removed from the stream. The resulting gaseous product is substantially free of these impurities, generally containing no more than about one ppm of carbon dioxide and a combined total of the other impurities not exceeding about one ppm.

The gaseous feed is preferably treated in a single treatment zone, preferably contained in a single vessel which includes a first adsorption section, a catalysis section and a second adsorption section. The first adsorption section contains one or more beds of a water-removing adsorbent, such as activated alumina, silica gel, zeolites or combination thereof. The catalysis section contains relatively low cost catalysts for the catalytic conversion of carbon monoxide to carbon dioxide and hydrogen to water vapor. The former catalyst is preferably a mixture of manganese and copper oxides, while the latter catalyst is preferably supported palladium. If the amount of hydrogen in the gaseous feed is such that its continued presence is not detrimental to the intended use of the purified product, then the catalyst for converting hydrogen to water vapor may be omitted. This can occur, for example, when the purified product is used for maintaining an inert environment in the production and storage of pharmaceuticals. On the other hand, the production of highly purified gas used in the manufacture of very high density computer chips will require the removal of even the minute amount of hydrogen typically present in air. In accordance with the present invention, such amounts of hydrogen can be removed by converting hydrogen to water vapor using supported palladium or other suitable oxidation catalyst in the catalysis section.

The present process may be conducted either batchwise or continuously. In either case, the treatment zone containing the two adsorption sections and the catalysis section must be periodically regenerated by purging the accumulated adsorbed impurities. In a batchwise system, purification of the gas feed must be stopped during regeneration of the treatment section. In the continuous system, a plurality of treatment zones are used with at least one treatment zone producing purified gas while at least one other treatment zone is undergoing regeneration.

In accordance with the present invention, the treatment zones may be regenerated by a purge gas at near feed temperatures or at elevated temperatures in a temperature-swing mode. The resulting gaseous products have no more than about one ppm carbon dioxide and no more than about one ppm total of other impurities. The process of the present invention is particularly suited for purifying air to obtain a feed gas suitable for the production of highly purified nitrogen gas by cryogenic distillation.

BRIEF DESCRIPTION OF THE DRAWINGS

The following drawings in which like reference characters indicate like parts are illustrative of embodiments of the invention and are not intended to limit the scope of the invention as encompassed by the claims forming part of the application:

DETAILED DESCRIPTION OF THE INVENTION

The process of the present invention produces a highly purified gaseous product with regard to four impurities, i.e. carbon monoxide, carbon dioxide, hydrogen and water vapor. It is to be understood that the term "impurities", as utilized herein, refers to these gases and does not include other gases such as, for example, trace amounts of hydrocarbons, which might be present in a feed gas mixture and which may otherwise be regarded as impurities.

It is further to be understood that the feed gas mixture contemplated herein contains at least one impurity of carbon monoxide and hydrogen. Carbon dioxide and water vapor may also be present either in the initial feed stream or may be generated during the oxidation step of the process. It is further necessary that the feed stream contain oxygen for the catalytic conversion of carbon monoxide and hydrogen as contemplated herein. In the event that the feed stream entering the oxidation step does not contain sufficient oxygen, oxygen may be added thereto in the form of highly purified oxygen, oxygen-enriched air or the like.

Figure 1:
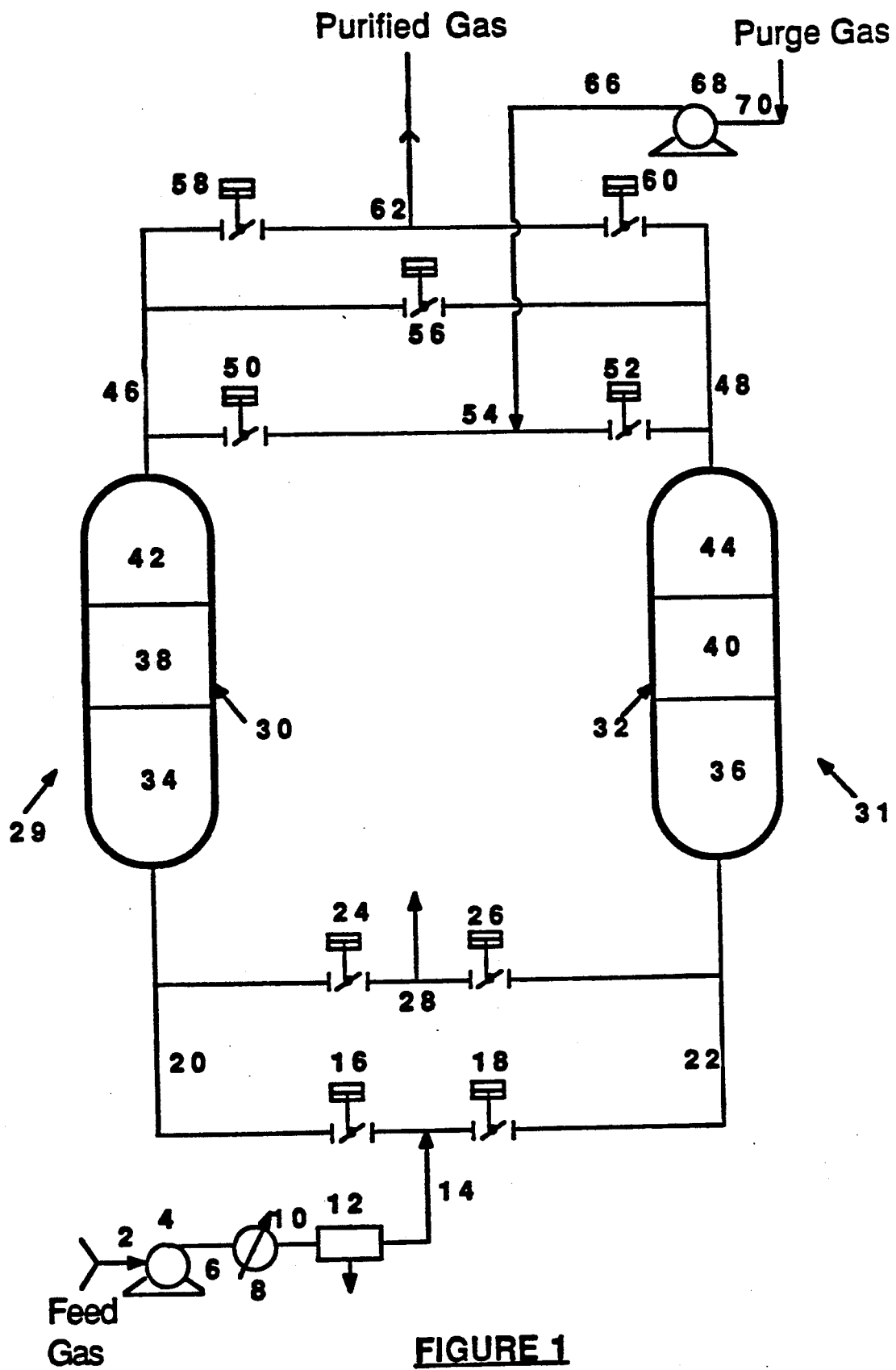
FIG. 1 is a schematic view of one embodiment of the invention showing a continuous process for the production of highly purified gas utilizing a pressure-swing mode of operation.

Referring to the drawings, and particularly to FIG. 1, there is shown a continuous process for the production of purified gas in which the treatment zone undergoing regeneration is purged with a gas at near the temperature of the gas feed.

A feed gas stream, as for example atmospheric air, is passed via a line 2 to a compressor 4 wherein the gas is compressed to about 75 to 150 psig. The compressed gas stream is then sent via a line 6 to a heat exchanger 8 wherein it is cooled prior to introduction via line 10 into a water separator 12 to remove liquid water therefrom. The effluent from the water separator 12 is at a temperature of from about 5° C. to 50° C., preferably from about 20° C. to 45° C.

The gas is sent via a line 14 through a valve 16 and a line 20 to a treatment zone 29 within a single vessel 30 which contains a lower adsorption section 34, a catalysis section 38, and an upper adsorption section 42.

The lower adsorption section 34 contains at least one bed of a water-removing adsorbent material such as activated alumina, silica gel, zeolites or combinations thereof which removes water vapor and some of the carbon dioxide present in the compressed gas stream. Most of the water vapor remaining in the compressed gas must be removed in the lower adsorbent section 34 in order to prevent deactivation of the oxidation catalysts present in the catalysis section 38 and to permit low temperature processing of the feed. Preferably, the adsorption section 34 comprises a predominant layer of activated alumina or silica gel and a layer of zeolite, for example, Zeolite 13X or 5A manufactured by UOP, Inc.

The gas stream then enters the catalysis section 38 within the treatment vessel 30. The physical separation of the three sections of the treatment vessel 30 is effected by means well known in the art. For example, the adsorption section 34 and the catalysis section 38 may be separated by a stainless steel screen which may also be employed to separate the catalysis section from the upper adsorption section 42.

The catalysis section 38 contains catalysts for the oxidation of carbon monoxide to carbon dioxide and for the conversion of hydrogen to water vapor. The catalysts used for eliminating carbon monoxide are preferably metal oxides such as nickel oxide or a mixture of the oxides of manganese and copper. The catalysts used to oxidize hydrogen to water vapor are preferably supported palladium and other noble metal catalysts known in the art. Preferably, the gas stream contacts the carbon monoxide oxidation catalysts prior to the hydrogen oxidation catalysts.

The thus-treated gas enters the upper adsorption section 42 for removal of carbon dioxide and water vapor. Adsorbents that may be used in the upper adsorption section 42 preferably include zeolites, activated aluminia, silica gel and combinations thereof.

The thus treated purified gas containing no more than about 1.0 ppm carbon dioxide and no more than about one ppm of the total of other impurities is withdrawn from the treatment vessel 30 through a line 46 and a valve 58 to a line 62 where it is sent to storage or for further processing such as by a cryogenic distillation facility.

At the same time the treatment zone 29 is purifying the gas feed, a treatment zone 31 is undergoing regeneration to remove accumulated impurities. The treatment vessel 32 is essentially the same as treatment vessel 30 and contains a corresponding lower adsorption section 36, a catalysis section 40 and an upper section 44. The structure of the three sections 36, 40, 44 and the materials contained therein are the same as described above for the sections 34, 38, 42, respectively.

After purifying the feed gas for a period of time, each of the lower and upper adsorption sections 36 and 44 become contaminated with carbon dioxide and water, and the catalysis section 40 accumulates small amounts of carbon monoxide and hydrogen. These impurities are removed by purging the vessel 32 with a gas which does not adversely affect the catalyst and is free of the impurities that are to be removed from the vessel 32. For example, if the feed gas is air, a suitable purge gas can be highly purified nitrogen, oxygen or mixtures thereof.

Prior to introduction of the purge gas, the vessel 32 is vented to reduce the pressure therein to close to atmospheric. This is carried out by opening valve 26 thereby venting through line 22 and exit line 28. Referring further to FIG. 1, a purge gas obtained from an independent source (not shown) as a side stream from the line 62, or as a waste gas from a cryogenic distillation column at a pressure of from about 1-5 psig is fed via a line 70 to an optional blower 68 where the pressure may be raised, if necessary. The gas flows via the line 66 to a line 54 and through a valve 52 into a line 48 where the purge gas enters the vessel 32.

The purge gas exits the vessel 32 through a line 22 and flows through a valve 26 and is thereafter discharged via a line 28. During this operation, the valve 24 connected to the line 20 is closed. After purging, it is preferred to gradually build up the pressure in the vessel 32 with a purified gas, referred to as "product backfill" in TABLE I. This repressurizing may be accomplished by diverting a small portion of the purified gas from the line 46 through the valve 56 and into the vessel 32 via the line 48.

Once purging and repressurization are completed, the vessel 32 is again ready to begin a purification cycle. This is done by closing the valve 16 and opening the valve 18 so that the gas stream flows from the line 14 to the line 22 and into the lower adsorption section 36 of the vessel 32. The purified gas obtained from the vessel 32 passes through the line 48 and a valve 60 into the exit line 62. At the same time, the flow of the feed stream to the vessel 30 is terminated by closing the valve 16 and regeneration is commenced by first venting the vessel 30 and then introducing the purge gas via lines 66, 54, and valve 50 into the line 46.

The time for completing a cycle in the pressure-swing mode of operation is typically from about 6 to 40 minutes. The cycle for the two-vessel process described in FIG. 1 is shown in TABLE I.

TABLE I

| Step | | Valves Open | Typical Time(sec) |
|---|---|---|---|
| a. | Purify using vessel 30, vent vessel 32 to atmosphere | 16,26,58 | 30 |
| b. | Purify using vessel 30, regenerate vessel 32 with impurity-free gas | 16,26,52,58 | 510 |
| c. | Purify using vessel 30, backfill vessel 32 with vessel 30 product | 16,56,58 | 60 |
| d. | Purify using vessel 32, vent vessel 30 to atmosphere | 18,24,60 | 30 |
| e. | Purify using vessel 32, regenerate vessel 30 with impurity-free gas | 18,24,50.60 | 510 |

TABLE I-continued

| Step | | Valves Open | Typical Time(sec) |
|---|---|---|---|
| f. | Purify using vessel 32, backfill vessel 30 with vessel 32 product | 18,56,60 | 60 |
| | | Total Time: | 20 minutes. |

The process of the present invention can also be carried out by heating the purge gas to temperatures well above the temperature of the feed stream. In this temperature-swing mode of the operation, the temperature of the feed gas is cooled to generally below the temperature of the feed gas employed in the pressure-swing embodiment, preferably in the range of from about 5° to 20° C.

Figure 2:
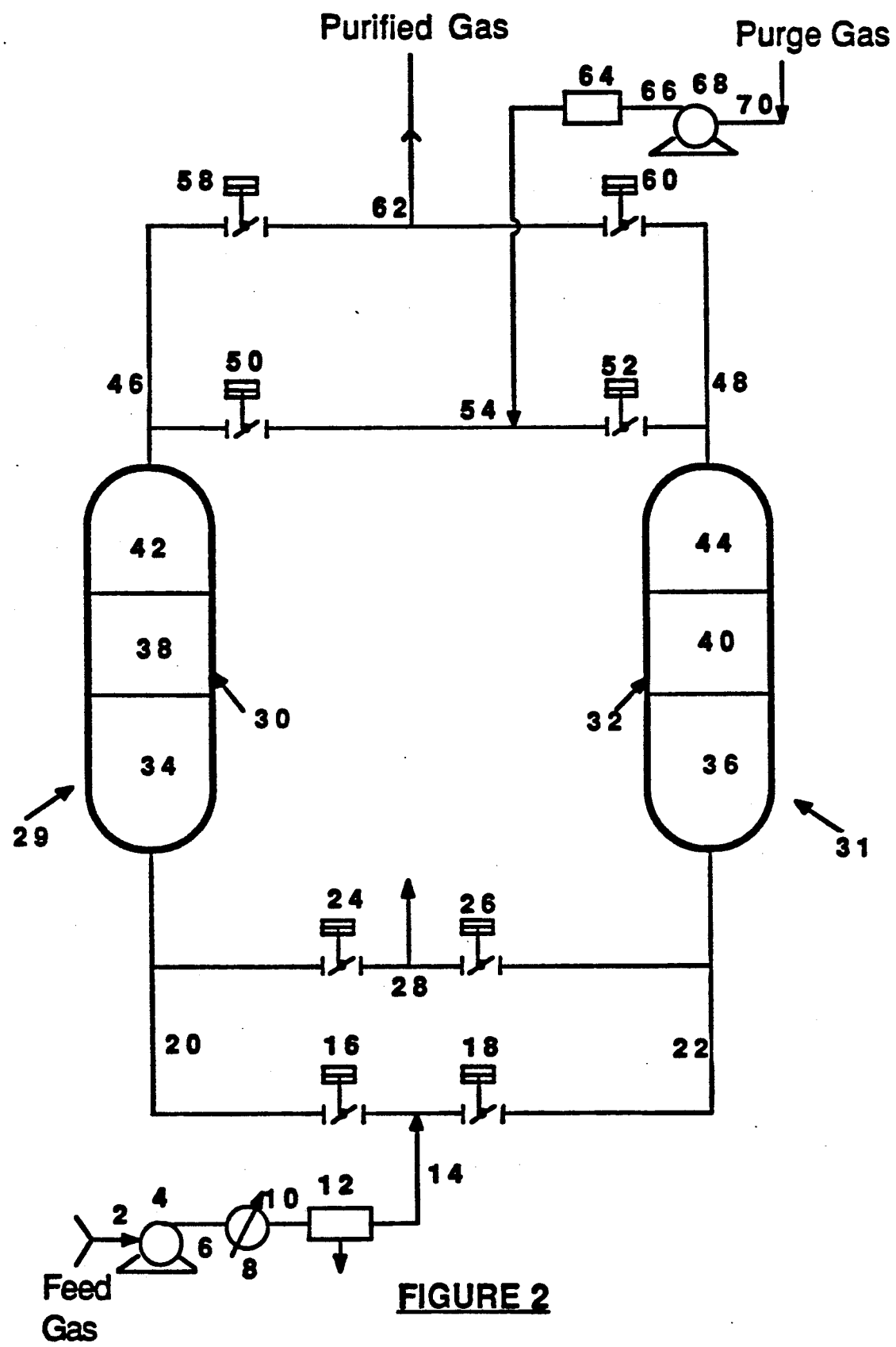
FIG. 2 is a schematic view of another embodiment of the invention, similar to that of FIG. 1, in which a temperature-swing mode of operation is utilized.

Referring to FIG. 2, the temperature-swing mode of operation commences by pressurizing the feed gas stream in the compressor 4 to a pressure of from about 75 to 150 psig. The compressed gas stream is then passed to a heat exchanger 8 through the line 6 and then to the water separator 12 though the line 10. The compressed gas exiting the water separator 12 is preferably at a temperature of from about 5° to 20° C. The operation of the treatment section 29 is the same as that described in connection with the embodiment of FIG. 1.

In the temperature-swing mode of operation shown in FIG. 2, the vessels 30 or 32 are normally pressurized slowly using part of the feed gas as opposed to product backfill as described in the pressure-swing mode of operation. For the repressurization of vessel 30, the valve 16 will be open while valve 18 is utilized for the repressurization of the vessel 32. After the repressurization of the vessel 30, purification of the feed gas takes place and the highly purified product is sent via the line 62 for downstream processing in, for example, a cryogenic distillation system. During purification in the vessel 30, the vessel 32 is first vented through the valve 24 and the line 28 and then regenerated using impurity-free purge gas which is passed to the optional blower 68 and then to a heater 64 via the line 66.

The temperature of the purge gas entering the system through line 70 is generally close to that of the feed gas. Therefore, the purge gas is heated in the heater 64, preferably to a temperature of from about 80° to 250° C. The heated regeneration gas passes through the line 54, the open valve 52 and the line 48 to vessel 32 and then to the line 28 via the open valve 26, thereby removing previously adsorbed impurities.

The heat supplied to the vessel 32 by the purge gas must be sufficient to desorb the impurities contained therein. Accordingly, it is preferable to turn off the heater 64 after sufficient heat has been introduced into the vessel 32. The amount of heat required for a given vessel can be routinely determined. The flow of purge gas continues after heater 64 has been turned off to remove desorbed impurities and to begin to cool the vessel 32 in preparation for the next purification step. After the vessel 32 is cooled sufficiently, it is slowly repressurized using a portion of the feed gas through the open valve 18 and the line 22. The vessel 30 continues to purify the feed gas during this time. After repressurization of the vessel 32, the vessel 30 undergoes the steps of venting, heating with purge gas and cooling with purge gas as described for the vessel 32. Simultaneously, the vessel 32 is purifying feed gas. The process can run continuously in this manner.

The complete cycle time for the temperature-swing process described in FIG. 2 normally is from about 8 to 24 hours, much longer than the cycle times for the pressure-swing mode of operation. A complete cycle for a two-bed process operated in the temperature-swing mode is given in TABLE II below.

TABLE II

| Step | Valves Open | Typical Time (hours) |
|---|---|---|
| a. Pressurize vessel 30 with feed, purify using vessel 32 | 16,18,60 | 0.25 |
| b. Purify using vessel 30, vent vessel 32 to atmosphere | 16,26,58 | 0.25 |
| c. Purify using vessel 30, regenerates vessel 32 with hot purge gas | 16,25,52,58 | 2.5 |
| d. Purify using vessel 30, cool vessel 32 with purge gas | 16,26,52,58 | 5.0 |
| e. Purify using vessel 30, pressurize vessel 32 with feed | 16,18,58 | 0.25 |
| f. Purify using vessel 32, vent vessel 30 to atmosphere | 18,24,60 | 0.25 |
| g. Purify using vessel 32, regenerate vessel 30 with hot purge gas | 18,24,50,60 | 2.5 |
| h. Purify using vessel 32, cool vessel 30 with purge gas | 18,24,50,60 | 5.0 |

As previously described in connection with FIG. 1, the purge gas should be free of the impurities to be removed by the system (i.e. substantially free of carbon monoxide, carbon dioxide, hydrogen and water vapor) and should not adversely affect the components of the three sections of the vessel. If the purified gas exiting the line 62 is sent to a cryogenic distillation system for further processing, the waste gas exiting the cryogenic system may be advantageously used as the purge gas.

Figure 3:
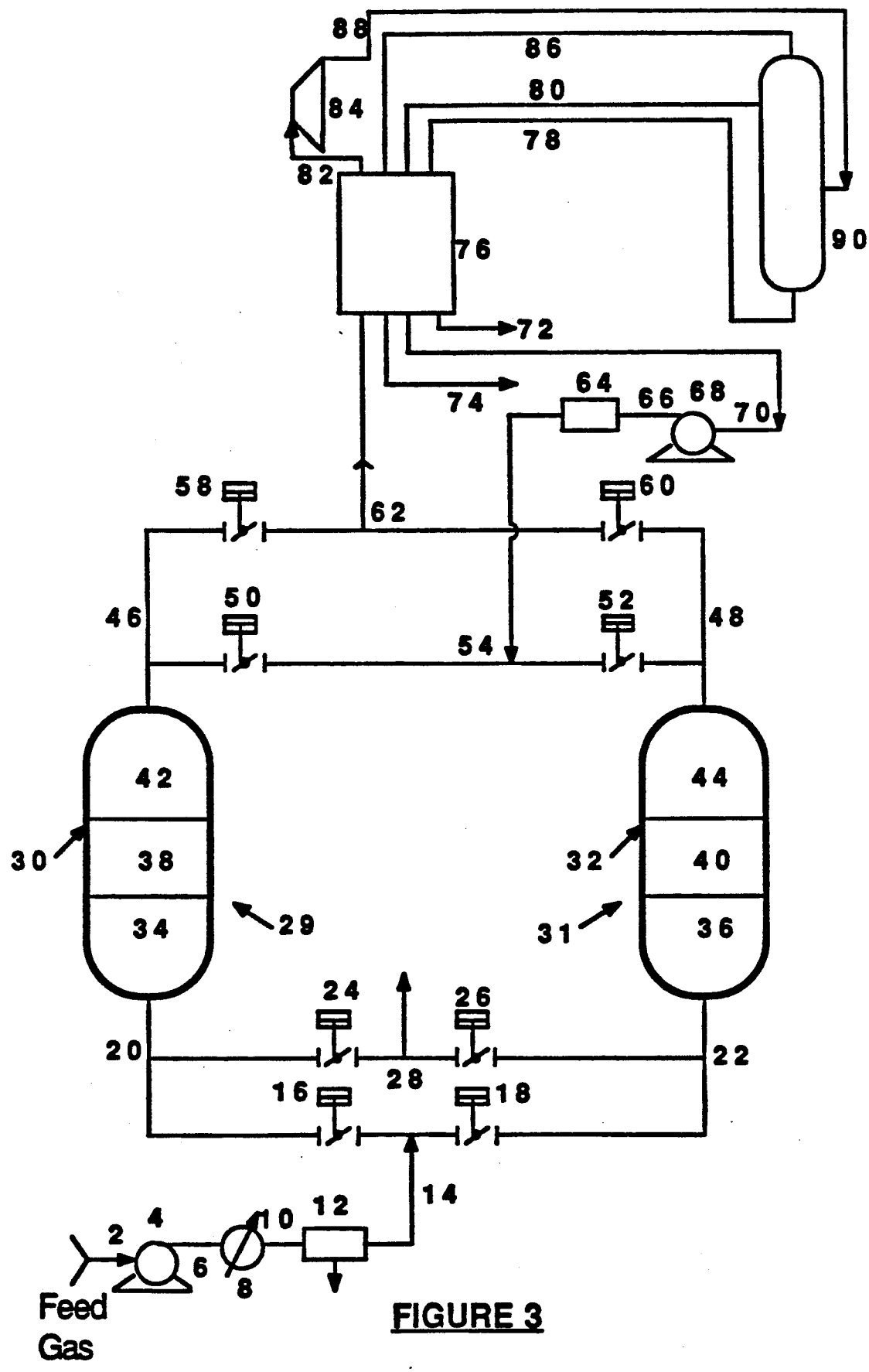
FIG. 3 is a schematic view of the embodiment of the invention shown in FIG. 2 showing further treatment of the highly purified gaseous product in a cryogenic distillation system.

A system for transferring the purified gas to a cryogenic distillation system is shown in FIG. 3. The purified gas stream exiting at line 62 is cooled in an exchanger 76 against the returning product streams 78 and 86 and the purge gas stream 80. The warmed product streams 72 and 74 are taken as products and sent to user equipment or storage. The warm purge gas stream 70 is used to regenerate the purification vessels as mentioned earlier. The cold feed gas stream 82 exiting the exchanger 76 is further cooled in a turboexpander 84 to produce a stream 88 which is cryogenically distilled in a column 90 to produce two product streams 86 and 78 and a waste stream 80 which is used as the purge gas. Modifications and additions of conventional cryogenic distillation systems would be apparent to those skilled in the art.

EXAMPLE I

A single-vessel process was operated in the pressure-swing mode as shown in FIG. 1. The first bed contained an initial layer of 27 lbs. of a commercially available activated alumina, then a layer of 1.7 lbs. of 6×14 mesh Hopcalite (a mixture of manganese and cooper oxides manufactured by MSA of Pittsburgh, Pa.) and a final layer of 11.6 lbs. of the activated alumina. Water-saturated feed air at a temperature of 25° C., a pressure of 140 psig, a flow rate of 23.0 std. cubic feet per min., and containing about 350 ppm $CO_2$ was passed through the vessel using the cycle sequence shown in TABLE I. Carbon monoxide at a controlled flow rate was blended in the feed air to give a feed gas stream carbon monoxide concentration of 5.5 ppm. The vessel was regenerated at the feed temperature (25° C.) using impurity-free nitrogen at an average flow rate (averaged over the entire cycle) of 9.7 std. cubic feet per sec.

The gas exiting the vessel contained less than 0.1 ppm $H_2O$, 1 ppm carbon dioxide and no carbon monoxide. The carbon monoxide in the feed air was converted to carbon dioxide by the Hopcalite layer and the remaining carbon dioxide and the oxidation producers were removed by the second activated alumina layer.

EXAMPLE II

A single vessel similar to that in Example I was loaded with a first layer of 27 lbs. of commercially available activated alumina, a second layer of 1.7 lbs. of 6×14 mesh Hopcalite, a third layer of 1.5 lbs. of a catalyst containing 0.5% by weight palladium supported on alumina (manufactured by Engelhard Corporation) and a final layer of 10 lbs. of activated alumina. The process was operated under the same conditions of Example I with the feed air containing 5.5 ppm of added CO and 2.0 ppm of added hydrogen in addition to the amounts of $H_2O$ and $CO_2$ stated in Example I. The gas exiting the vessel contained no $H_2$ no CO, less than 0.1 ppm of $H_2O$ and less than 1 ppm of carbon dioxide.

EXAMPLES III–VI

The process of the present invention was conducted in accordance with the scheme shown and described in FIG. 2 wherein the purge gas was heated to a temperature exceeding the temperature of the feed gas air.

The lower adsorption section 34 of the vessel 30 was charged with a layer of 11.5 lbs. of activated alumina having thereon a layer of Zeolite 13X in an amount of 5.7 lbs. The catalysis section 38 was charged with ⅛" Carulite 200 pellets (a mixture of manganese and copper oxides manufactured by Carus Chemical Company of Ottawa, Ill.) in the amounts shown in TABLE IV. The upper adsorption section 42 was provided with 5.4 lbs. of Zeolite 13X.

A water-saturated air stream pressurized to 80 psig containing about 350 ppm of carbon dioxide and varying amounts of carbon monoxide was forwarded to the vessel 30 at the rate of 28.8 standard cubic feet per min. Simultaneously, a regeneration flow of a purge gas at the rate of 5.1 standard cubic feet per min. was used to remove impurities from the vessel 32. At a feed temperature of 4.4° C. a regeneration gas temperature of 121° C., was utilized. Using a higher feed temperature of 12.5° C., a regeneration gas temperature of 148.9° C. was utilized.

The time necessary to perform each step of the purification and regeneration cycles is shown in TABLE III.

TABLE III

| Step | Time (hr.) |
|---|---|
| Vessel pressurization | 0.2 |
| Feed purification | 6.0 |
| Vessel venting | 0.1 |
| Heating with impurity-free nitrogen | 3.5 |
| Cooling with impurity-free nitrogen | 2.2 |
| Total | 12.0 hrs. |

As seen from TABLE III, the time necessary to complete a single cycle of purification and regeneration is 12.0 hrs. during the temperature-swing adsorption mode or approximately twenty times longer than the time needed to complete a single cycle in the pressure-swing adsorption mode of operation.

TABLE IV shows that in each of EXAMPLES III-VI, the conversion of carbon monoxide to carbon dioxide is very high. This is accomplished at very low feed temperatures in accordance with the present invention in part because substantially all of the water vapor has been removed.

TABLE IV

| Example Number | Feed Temp. (°F.) | Feed CO Conc. (ppm) | Amount of Carulite (lbs.) | Av. Conversion of CO to $CO_2$ (%) |
|---|---|---|---|---|
| III | 40.0 | 9.0 | 3.0 | 92.0 |
| IV | 40.0 | 4.9 | 3.0 | 95.0 |
| V | 54.5 | 4.9 | 3.0 | 100.0 |
| VI | 40.0 | 4.9 | 4.5 | 100.0 |

In all examples, the gas exiting the lower adsorption section contained less than 0.1 ppm of water vapor and the gas recovered from the upper adsorption section contained less than 1 ppm carbon dioxide.

I claim:

1. Apparatus useful for producing a substantially pure nitrogen stream from a gas stream containing nitrogen, hydrogen, carbon monoxide, carbon dioxide, water vapor and oxygen comprising:
   a) a first adsorption zone having an inlet and an outlet and containing an adsorbent which adsorbs moisture and carbon dioxide from a gas stream,
   b) a catalytic reaction zone having an inlet and an outlet and containing a catalyst which, in the presence of oxygen, converts carbon monoxide to carbon dioxide and hydrogen to water, the inlet of said catalytic reaction zone being in fluid communication with the outlet of said first adsorption zone,
   c) a second adsorption zone having an inlet and an outlet and containing an adsorbent which adsorbs moisture and carbon dioxide, the inlet of said second adsorption zone being in fluid communication with the outlet of said catalytic reaction zone,
   d) a cryogenic gas separation unit adapted to separate nitrogen from oxygen having an inlet in fluid communication with the outlet of said second adsorption zone, and
   e) conduit means connecting said cryogenic gas separation unit with at least one of said first and second adsorption zones for purging said first and second adsorption zones with a waste stream from said cryogenic separation unit.

2. The apparatus of claim 1 wherein said first and second adsorption zones contain an adsorbent selected from zeolites, activated alumina, silica gel and mixtures of these.

3. The apparatus of claim 1 wherein said catalytic reaction zone contains a metal oxide oxidation catalyst.

4. The apparatus of claim 3 wherein said metal oxide oxidation catalyst is selected from nickel oxide and a mixture of the oxides of copper and manganese.

5. The apparatus of claim 1 wherein said catalytic reaction zone contains a noble metal catalyst.

6. The apparatus of claim 5 wherein said noble metal catalyst is palladium.

7. Apparatus useful for producing a substantially pure nitrogen stream from a gas stream containing nitrogen, hydrogen, carbon monoxide, carbon dioxide, water vapor and oxygen comprising:
   a) a first adsorption zone containing an adsorbent selected from the group consisting of zeolites, activated alumina, silica gel and mixtures of these,
   b) a catalytic reaction zone in fluid communication with said first adsorption zone and containing at least one carbon monoxide oxidation catalyst selected from nickel oxide and mixed oxides of copper and manganese and at least one noble metal hydrogen oxidation catalyst,
   c) a second adsorption zone in fluid communication with said catalytic reaction zone and containing an adsorbent selected from the group consisting of zeolites, activated alumina, silica gel and mixtures of these, and
   d) a cryogenic gas separation unit in fluid communication with said second adsorption zone and being adapted to separate nitrogen from other components of a gas stream, and
   e) conduit means connecting said cryogenic gas separation unit with at least one of said first and second adsorption zones for purging said first and second adsorption zones with a waste stream from said cryogenic separation unit.

8. The apparatus of claim 7 wherein said noble metal hydrogen oxidation catalyst is palladium.

* * * * *